(12) United States Patent
Nakamura

(10) Patent No.: US 10,449,620 B2
(45) Date of Patent: Oct. 22, 2019

(54) WELDING APPARATUS AND WELDING METHOD

(71) Applicant: DENSO CORPORATION, Kariya, Aichi-pref. (JP)

(72) Inventor: Masaya Nakamura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 382 days.

(21) Appl. No.: 14/674,505

(22) Filed: Mar. 31, 2015

(65) Prior Publication Data

US 2015/0273619 A1 Oct. 1, 2015

(30) Foreign Application Priority Data

Mar. 31, 2014 (JP) .................. 2014-070802

(51) Int. Cl.
*B23K 11/00* (2006.01)
*B23K 11/24* (2006.01)
*B23K 11/25* (2006.01)

(52) U.S. Cl.
CPC ........ *B23K 11/0046* (2013.01); *B23K 11/002* (2013.01); *B23K 11/004* (2013.01); *B23K 11/0033* (2013.01); *B23K 11/241* (2013.01); *B23K 11/252* (2013.01); *B23K 11/253* (2013.01)

(58) Field of Classification Search
CPC .............. B23K 11/0046; B23K 11/002; B23K 11/0033; B23K 11/004; B23K 11/241; B23K 11/252; B23K 11/253; B23K 11/24; B23K 11/25; B23K 2219/45135
USPC ............. 219/86.41, 110, 91.1, 108; 313/118; 29/746; 228/8, 9; 445/7, 4, 64, 67; 374/101, 102, 107, 141, 100, 163
See application file for complete search history.

(56) References Cited

U.S. PATENT DOCUMENTS 5,397,872 A * 3/1995 Baker .................. B23K 11/252
219/109
6,359,249 B1 * 3/2002 Brown ................. B21D 39/021
219/86.31

(Continued)

FOREIGN PATENT DOCUMENTS

JP H08-10962 A 1/1996
JP H09-277061 A 10/1997

(Continued)

*Primary Examiner* — Dana Ross
*Assistant Examiner* — Joseph M Baillargeon
(74) *Attorney, Agent, or Firm* — Oliff PLC

(57) ABSTRACT

A welding apparatus for resistance-welding a tubular member and a bar member includes: a positioning jig configured to make contact with the bar member from one side of the bar member in a direction perpendicular to an extending direction of the bar member; a first power supply jig configured to press the bar member from the other side of the bar member in the direction; a second power supply jig provided on an anti-bar member side of the tubular member and configured to apply pressure to contact surfaces of the bar member and the tubular member; and means for supplying, with the bar member pressed between the positioning jig and the first power supply jig and the second power supply jig applying pressure to the contact surfaces, electric current to the first power supply jig, the bar member, the contact surfaces, the tubular member and the second power supply jig.

10 Claims, 14 Drawing Sheets

(56) References Cited

U.S. PATENT DOCUMENTS

| | | | |
|---|---|---|---|
| 6,423,950 B2* | 7/2002 | Moro | B23K 3/033 |
| | | | 219/110 |
| 2005/0174025 A1 | 8/2005 | Okamoto | |
| 2007/0023401 A1* | 2/2007 | Tsukamoto | B23K 11/002 |
| | | | 219/86.22 |
| 2008/0302774 A1* | 12/2008 | Meulenberg | B23K 11/02 |
| | | | 219/137 R |
| 2009/0289041 A1 | 11/2009 | Tsukamoto et al. | |
| 2012/0145677 A1 | 6/2012 | Shirai et al. | |
| 2015/0108110 A1* | 4/2015 | Freymiller | A47J 37/0611 |
| | | | 219/448.13 |

FOREIGN PATENT DOCUMENTS

| | | |
|---|---|---|
| JP | H10-128550 A | 5/1998 |
| JP | 2005-251727 A | 9/2005 |
| JP | 2007-030013 A | 2/2007 |
| JP | 2010-277947 A | 12/2010 |
| JP | 2012-139727 A | 7/2012 |
| JP | 2013-004412 A | 1/2013 |

\* cited by examiner

|  | GROUND ELECTRODE | HOUSING |
|---|---|---|
| MATERIAL | NICKEL ALLOY | CARBON STEEL |
| ELECTRICAL RESISTANCE ($\mu\Omega$cm) | 107.3 | 8.9 |
| VOLUME (mm³) | 43.68 | 2004.576 |

FIG.8
(A)
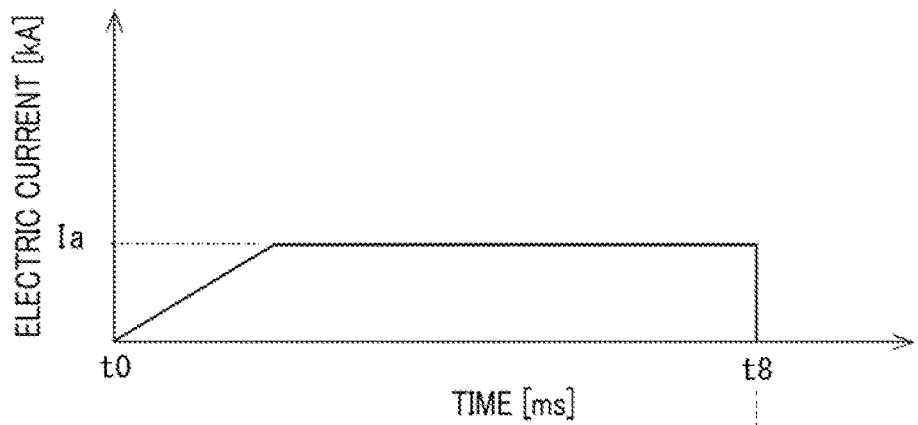
(B)
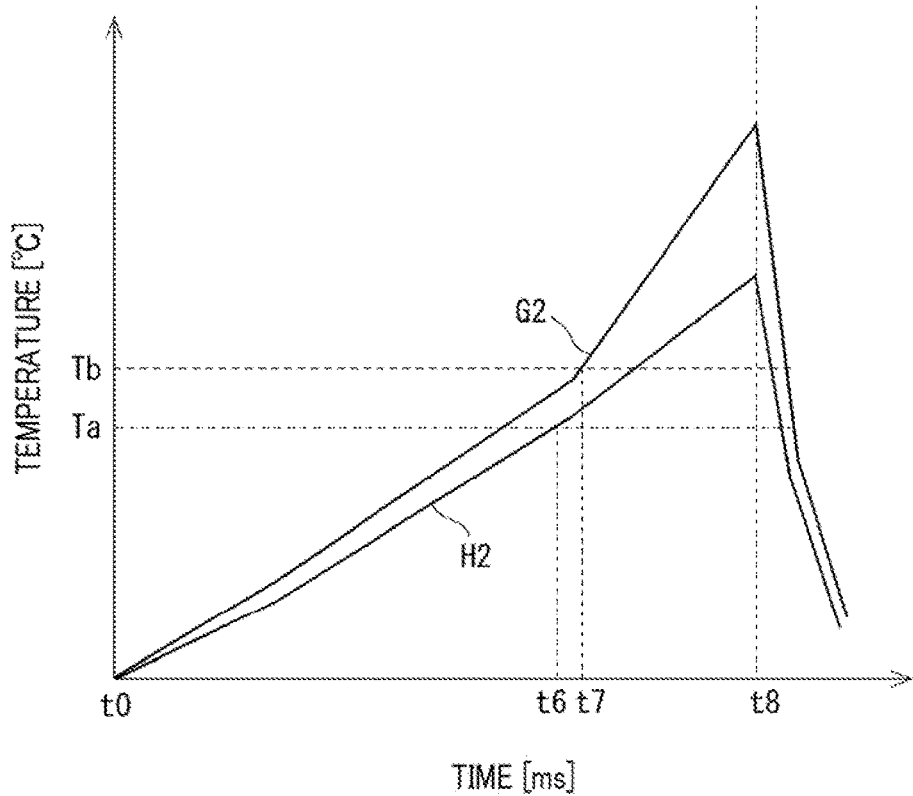

FIG.9
(A) 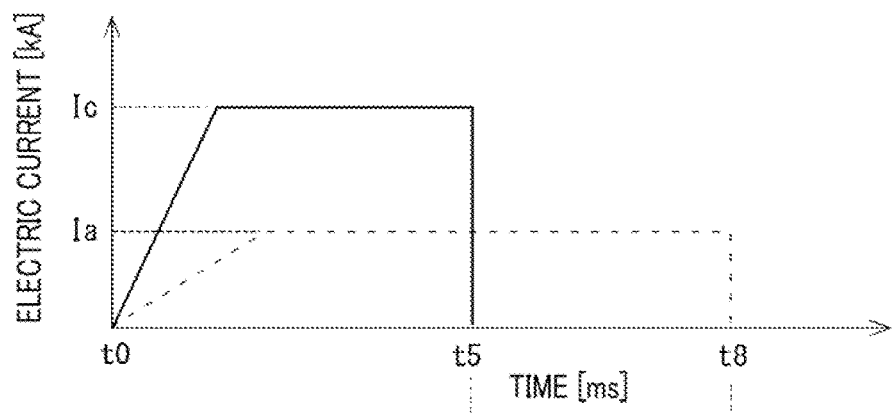
(B) 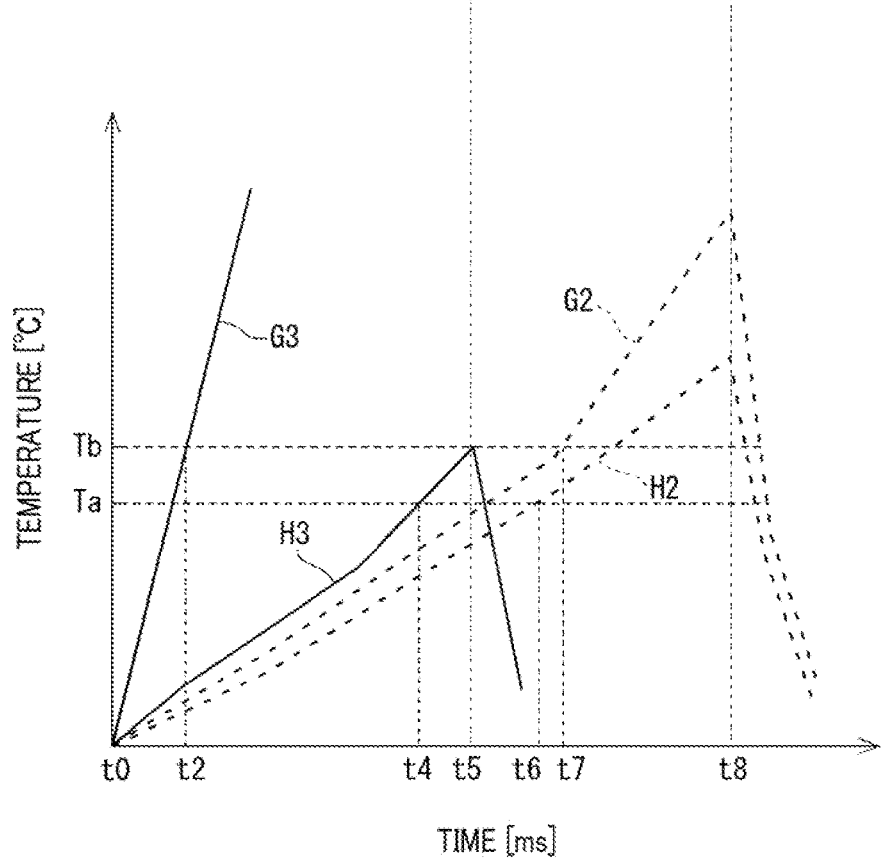

FIG.10
(A)
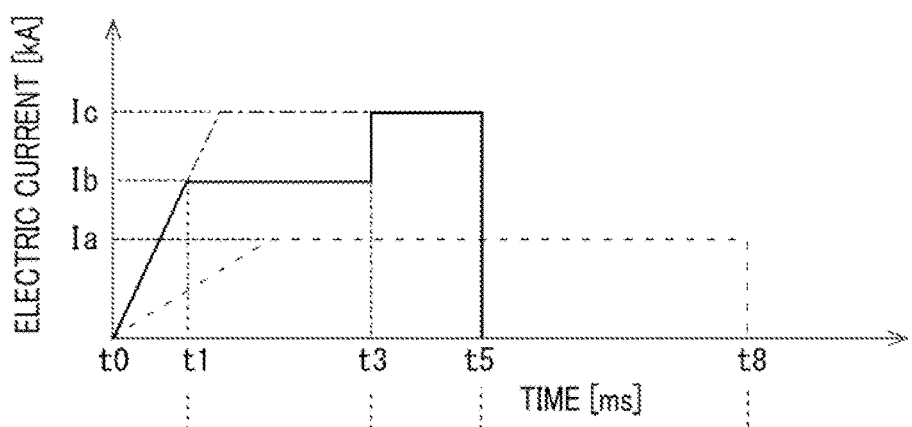
(B)
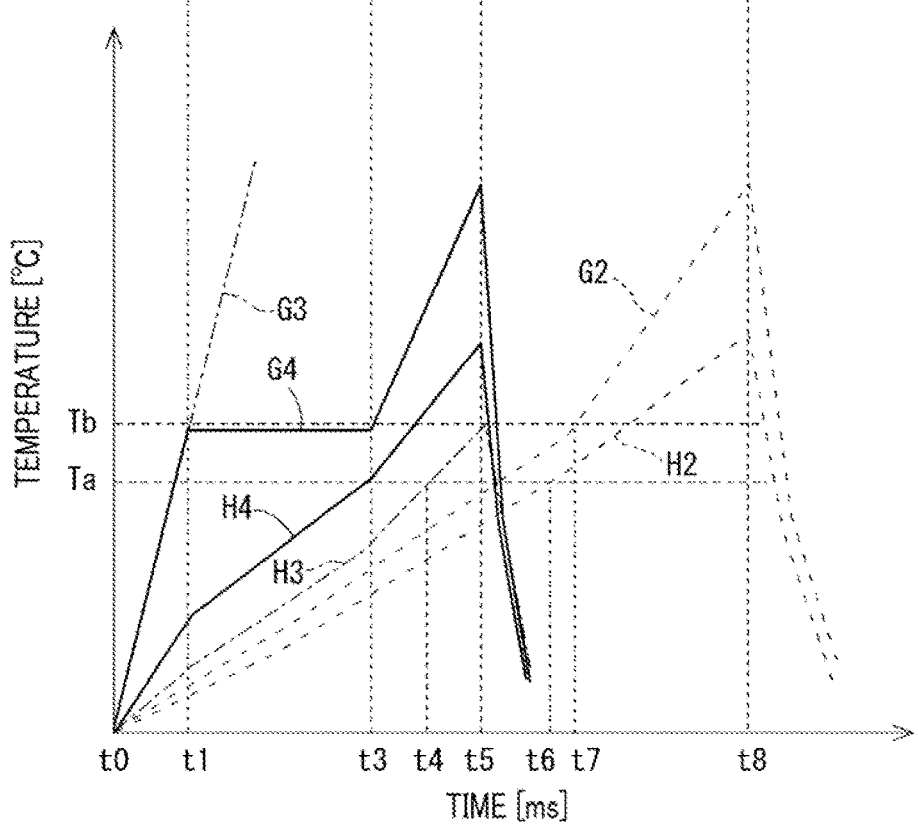

WELDING APPARATUS AND WELDING METHOD

CROSS-REFERENCE TO RELATED APPLICATION

This application is based on and claims priority from Japanese Patent Application No. 2014-70802, filed on Mar. 31, 2014, the content of which is hereby incorporated by reference in its entirety into this application.

BACKGROUND

1. Technical Field

The present invention relates to welding apparatuses and welding methods.

2. Description of Related Art

Conventionally, there have been known welding apparatuses that join two members by: applying electric current to the two members in contact with each other; melting materials of the two members adjacent to the contact surfaces of the two members by resistance heat generated at the contact surfaces; and pressing the two members against each other.

Japanese Patent Application Publication No. JP2007030013A discloses a welding apparatus that supplies electric current to a second member, which is inserted in a hole of a first member, so as to expand the second member by the Joule heat, thereby applying pressure to the interface between an inner wall of the hole of the first member and an outer wall of the second member. Then, the welding apparatus supplies electric current to flow through the first and second members via the contact surfaces thereof, thereby resistance-welding the contact surfaces.

However, since the welding apparatus disclosed in the above patent document applies pressure to the inner wall of the hole of the first member and the outer wall of the second member by thermally expanding the second member by supplying electric current thereto, there is a concern that a long time may be required to accomplish the resistance welding.

SUMMARY

According to exemplary embodiments, there is provided a welding apparatus for resistance-welding a tubular member and a bar member arranged in contact with one axial end surface of the tubular member. The welding apparatus includes: a positioning jig configured to make contact with the bar member from one side of the bar member in a direction perpendicular to an extending direction of the bar member; a first power supply jig configured to press the bar member from the other side of the bar member in the direction perpendicular to the extending direction of the bar member; a second power supply jig provided on an anti-bar member side of the tubular member and configured to apply pressure to contact surfaces of the bar member and the tubular member; and means for supplying, with the bar member pressed between the positioning jig and the first power supply jig and the second power supply jig applying pressure to the contact surfaces of the bar member and the tubular member, electric current to the first power supply jig, the bar member, the contact surfaces, the tubular member and the second power supply jig.

With the above configuration, it is possible to perform the pressing of the bar member by the first power supply jig and the application of pressure to the contact surfaces by the second power supply jig either concurrently or consecutively. As a result, it is possible for the welding apparatus to resistance-weld the tubular member and the bar member in a short time.

Preferably, the welding apparatus may further include a pressure application jig that is provided on an anti-housing side of the bar member to apply, together with the second power supply jig, pressure to the contact surfaces of the bar member and the tubular member.

It is preferable that the first power supply jig has a contacting portion capable of making surface contact or line contact with the bar member.

Preferably, the first power supply jig may be configured to press the bar member at a position slightly away from the contact surfaces of the bar member and the tubular member so as to suppress buckling of the bar member due to Joule heat on a housing side of a contact region between the first power supply jig and the bar member.

It is preferable that the bar member has a smaller heat capacity than the tubular member. The welding apparatus may preferably further include means for controlling the electric current supplied by the electric current supplying means so as to keep the temperature of the bar member at a temperature at which it is possible to suppress melting of the bar member until a predetermined time has elapsed from start of the electric current supply and then increase the temperatures of the bar member and the tubular member to temperatures at which it is possible to melt the bar member and the tubular member.

Moreover, the welding apparatus may preferably further include means for detecting a temperature of the contact surfaces. The controlling means may preferably control the electric current supplied by the electric current supplying means based on the temperature of the contact surfaces detected by the temperature detecting means.

Furthermore, the controlling means may preferably control the electric current supplied by the electric current supplying means so as to keep the temperature of the bar member at the temperature at which it is possible to suppress melting of the bar member until the temperature of the contact surfaces detected by the temperature detecting means has been increased to a temperature at which it is possible to melt the tubular member.

The welding apparatus may preferably further include means for detecting a displacement magnitude caused by a welding deformation of the tubular member and the bar member. The controlling means may preferably control, based on the displacement magnitude detected by the displacement magnitude detecting means, a pressure-applying force of the second power supply jig as well as the electric current supplied by the electric current supplying means.

It is preferable that the electric current supplying means supplies, as the electric current, DC electric current through an inverter control.

According to the exemplary embodiments, there is also provided a method of resistance-welding a tubular member and a bar member arranged in contact with one axial end surface of the tubular member. The method includes the steps of pressing the bar member by a first power supply jig; applying pressure to contact surfaces of the bar member and the tubular member by a second power supply jig; and supplying electric current, after the pressing step and the pressure applying step, electric current to the first power supply jig, the bar member, the contact surfaces, the tubular member and the second power supply jig.

With the above method, it is possible to perform the pressing step and the pressure applying step either concurrently or consecutively. As a result, it is possible to resistance-weld the tubular member and the bar member in a short time.

Preferably, the bar member has a smaller heat capacity than the tubular member. In the electric current supplying step, the electric current is supplied so as to keep the temperature of the bar member at a temperature at which it is possible to suppress melting of the bar member until a predetermined time has elapsed from start of the electric current supply and then increase the temperatures of the bar member and the tubular member to temperatures at which it is possible to melt the bar member and the tubular member.

In one exemplary embodiment, the method further includes, before the pressing step and the pressure applying step, a step of forming a protrusion at a tubular member-side end of the bar member.

In another exemplary embodiment, the method further includes, before the pressing step and the pressure applying step, a step of forming a recess, which is smaller than a cross section of the bar member, in the axial end surface of the tubular member facing the bar member.

In yet another exemplary embodiment, the method further includes, before the pressing step and the pressure applying step, a step of forming a protrusion on the axial end surface of the tubular member facing the bar member.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 8 is a graphical representation showing the relationship between the electric current supply time, electric current and temperature of each workpiece when a conventional electric current supply pattern is used;

FIG. 9 is a graphical representation showing the relationship between the electric current supply time, electric current and temperature of each workpiece when an electric current supply pattern according to a comparative example is used;

FIG. 10 is a graphical representation showing the relationship between the electric current supply time, electric current and temperature of each workpiece when an electric current supply pattern according to the first embodiment is used;

DESCRIPTION OF EMBODIMENTS

Figure 1:
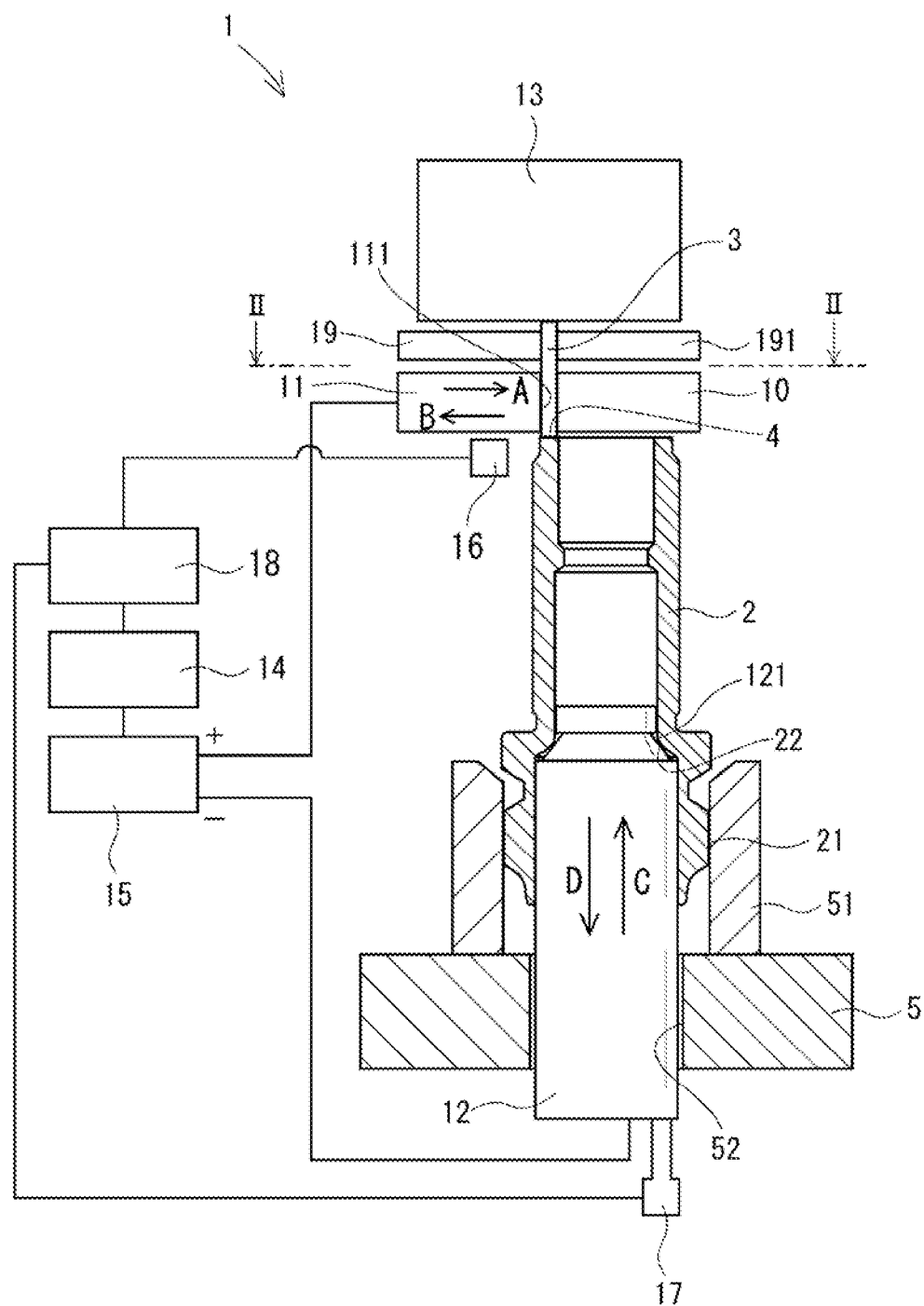
FIG. 1 is a configuration diagram of a welding apparatus according to a first embodiment.

Exemplary embodiments will be described hereinafter with reference to FIGS. 1-21. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a welding apparatus 1 according to a first embodiment.

In the present embodiment, the welding apparatus 1 is configured to resistance-weld contact surfaces 4 of two workpieces which are respectively a tubular housing 2 for use in a spark plug and a bar-shaped ground electrode 3 arranged in contact with one axial end surface of the housing 2. In addition, the housing 2 corresponds to an example of "a tubular member", and the ground electrode 3 corresponds to an example of "a bar member".

As shown in FIG. 1, the housing 2 is mounted on a conveying device 5 and conveyed to the welding apparatus 1. A supporting member 51 provided in the conveying device 5 abuts a planar portion 21 formed on a radially outer periphery of the housing 2. Consequently, the housing 2 is positioned in a direction of rotation (or circumferential direction) thereof. On the axial end surface (i.e., the upper end surface in FIG. 1) of the housing 2, there is arranged the ground electrode 3.

The welding apparatus 1 includes a first positioning jig 10, a first power supply jig 11, a second power supply jig 12, a pressure application jig 13, a welding power source 14, a transformer 15, a temperature sensor 16, a displacement sensor 17 and a controller 18.

The first positioning jig 10 is fixed on one side of the ground electrode 3 in a direction perpendicular to the extending direction (or longitudinal direction) of the ground electrode 3. The first positioning jig 10 is capable of abutting the ground electrode 3.

The first power supply jig 11 is provided on the other side of the ground electrode 3 in the direction perpendicular to the extending direction of the ground electrode 3. The first power supply jig 11 can be reciprocated, by en actuator (not shown), in directions indicated with arrows A and B in FIG. 1. In addition, in the present embodiment, the direction perpendicular to the extending direction of the ground electrode 3 corresponds to a radial direction of the housing 2.

Second positioning jigs 19 and 191 are respectively provided on the anti-housing side (i.e., the opposite side to the housing) of the first power supply jig 11 and the anti-housing side of the first positioning jig 10 and support the ground electrode 3.

Figure 2:
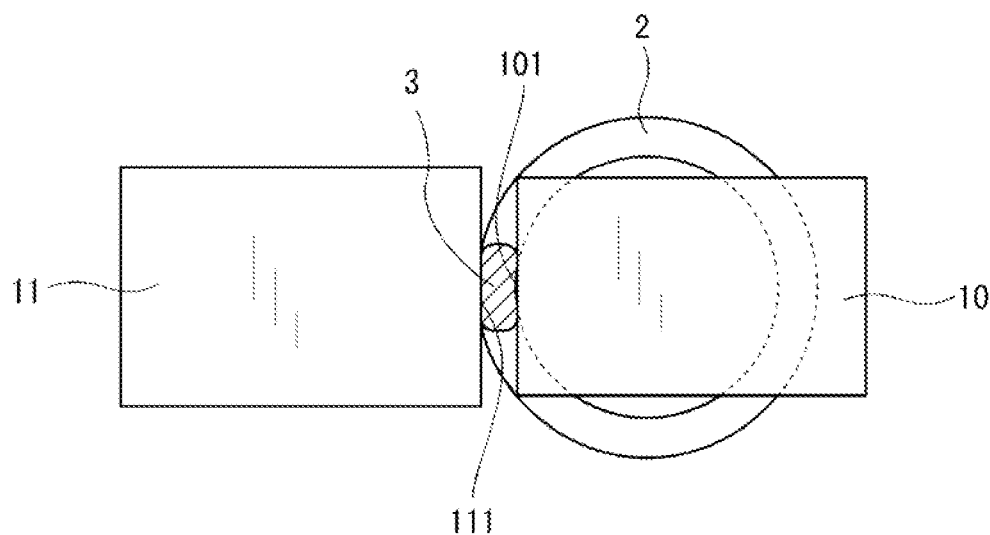
FIG. 2 is a cross-sectional view taken along the line II-II in FIG. 1.

As shown in FIGS. 1 and 2, the first positioning jig 10 and the first power supply jig 11 are each cuboid-shaped and respectively have contacting portions 101 and 111 capable of making surface contact with the ground electrode 3. In addition, the first positioning jig 10 and the first power supply jig 11 can be used with the positions of the contacting portions 101 and 111 being offset according to the aged deterioration thereof.

Figure 3:
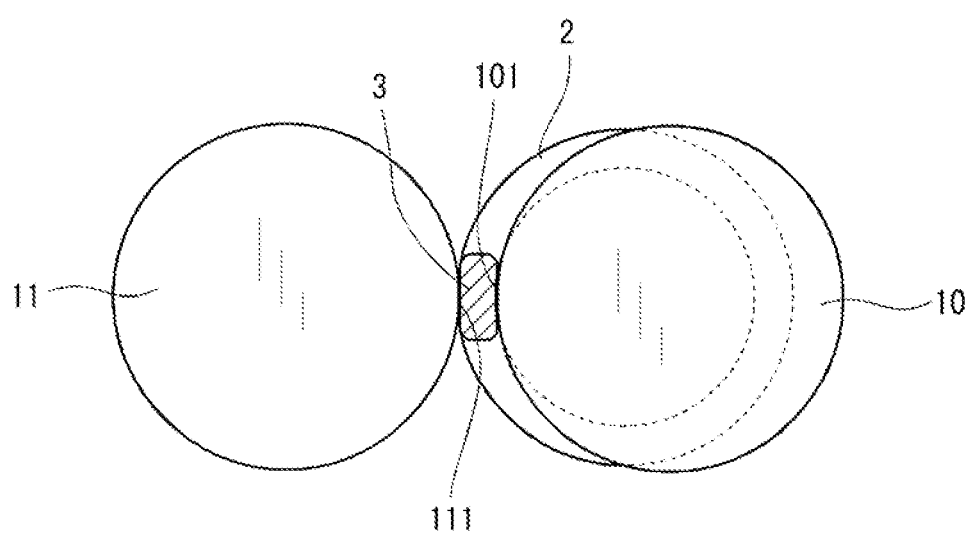
FIG. 3 is a schematic view illustrating a modification of a first power supply jig according to the first embodiment.

Moreover, as shown in FIG. 3, as a modification of the first embodiment, the first positioning jig 10 and the first power supply jig 11 may be each cylindrical-shaped. In this case, the first positioning jig 10 and the first power supply jig 11 respectively have contacting portions 101 and 111 capable of making line contact with the ground electrode 3.

As shown in FIG. 1, when the first power supply jig 11 presses the ground electrode 3 in the direction of arrow A with the first positioning jig 10 abutting the ground electrode 3, the contacting portion Ill of the first power supply jig 11 and the ground electrode 3 are brought into intimate contact with each other. Consequently, the constriction resistance to electric current flowing through the contact region between the contacting portion 111 of the first power supply jig 11 and the ground electrode 3 becomes low. Accordingly, in performing the resistance welding, the Joule heat generated at the contact region will be small, thus making it possible to prevent buckling of the ground electrode 3.

Moreover, the contacting portion 111 of the first power supply jig 11 presses the ground electrode 3 at a position slightly away from the contact surfaces 4 of the ground electrode 3 and the housing 2. More specifically, in the present embodiment, the distance between the contacting portion 111 of the first power supply jig 11 and the contact surfaces 4 is in the range of, for example, 0.3 to 1.0 mm. Consequently, in performing the resistance welding, it is possible to suppress buckling of that part of the ground electrode 3 which is positioned on the housing side of the contact region between the first power supply jig 11 and the ground electrode 3.

The pressure application jig 13 is fixed on the anti-housing side of the ground electrode 3 so as to be capable of making contact with an anti-housing-side end surface of the ground electrode 3.

On the other hand, the second power supply jig 12 is provided on the anti-ground electrode side (i.e., the opposite side to the ground electrode) of the housing 2. As indicated with arrows C and D in FIG. 1, the second power supply jig 12 can be reciprocated, by an actuator (not shown), in an axial direction of the housing 2.

The second power supply jig 12 has a taper portion 121 which has a larger outer diameter on the anti-ground electrode side than on the ground electrode side. On the other hand, the inner wall of the tubular housing 2 has a larger inner diameter at the anti-ground electrode-side end than at the ground electrode-side end. Accordingly, there is provided a step (or shoulder) 22 in the inner wall of the housing 2. The taper portion 121 of the second power supply jig 12 can make line contact or surface contact with the step 22 of the housing 2.

When the housing 2 mounted on the conveying device 5 is conveyed to a position immediately above the second power supply jig 12, the jig 12 is moved in the direction of arrow C through a hole 52 formed in the conveying device 5, thereby bringing the taper portion 121 of the second power supply jig 12 into line contact or surface contact with the step 22 of the housing 2. In this state, the second power supply jig 12 is further moved to lift the housing 2 toward the pressure application jig 13, thereby bringing the anti-housing-side end surface of the ground electrode 3 into contact with the pressure application jig 13. Moreover, the second power supply jig 12 further presses the housing 2 in the direction of arrow C, thereby applying pressure to the contact surfaces 4 of the housing 2 and the ground electrode 3.

The welding power source 14 is capable of supplying electric current, via the transformer 15, to the first power supply jig 11, the ground electrode 3, the contact surfaces 4, the housing 2 and the second power supply jig 12. In addition, the welding power source 14 and the transformer 15 together correspond to an example of "electric current supplying means".

The welding power source 14 is capable of supplying DC electric current through an inverter control. In addition, though the positive electrode of the transformer 15 is connected to the first power supply jig 11 side and the negative electrode is connected to the second power supply jig 12 side in FIG. 1, the positive and negative electrodes may also be conversely connected.

The temperature sensor 16 is provided in the vicinity of the contact surfaces 4 of the housing 2 and the ground electrode 3. The temperature sensor 16 senses, in a contact-less manner, the temperature of a part of the housing 2 adjacent to the contact surfaces 4.

To either the housing 2 or the second power supply jig 12, there is mounted the displacement sensor 17 that is capable of sensing the displacement magnitude of the housing 2 and the second power supply jig 12. More specifically, the displacement sensor 17 is capable of sensing the displacement magnitude caused by a welding deformation of the housing 2 and the ground electrode 3 during the resistance welding thereof.

In addition, the temperature sensor 16 corresponds to an example of "temperature detecting means", and the displacement sensor 17 corresponds to an example of "displacement magnitude detecting means".

The controller 18 is a programmable logic controller, to which signals from the temperature sensor 16 and the displacement sensor 17 are inputted. In addition, the controller 18 corresponds to an example of "controlling means".

The controller 18 is capable of detecting the temperature of the contact surfaces 4 during the resistance welding based on the signal inputted from the temperature sensor 16.

The controller 18 controls, based on the temperature sensed by the temperature sensor 16 and the displacement magnitude sensed by the displacement sensor 17, the electric current supplied from the welding power source 14 to the first and second power supply jigs 11 and 12 and the pressure-applying force of the second power supply jig 12.

In performing the resistance welding by the welding apparatus 1, first, as indicated with arrow A in FIG. 1, the first power supply jig 11 is moved toward the first positioning jig 10, thereby pressing the ground electrode 3 between the first power supply jig 11 and the first positioning jig 10. Then, as indicated with arrow C in FIG. 1, the second power supply jig 12 is moved toward the pressure application jig 13, causing pressure to be applied to the contact surfaces 4 of the housing 2 and the ground electrode 3 by the second power supply jig 12 and the pressure application jig 13. In this state, electric current (or welding current) is supplied from the welding power source 14, via the transformer 15, to the first power supply jig 11, the ground electrode 3, the contact surfaces 4, the housing 2 and the second power supply jig 12, thereby melting the materials of the housing 2 and the ground electrode 3 at and inside the contact surfaces 4. At this time, with the second power supply jig 12 being further moved toward the pressure application jig 13 to apply pressure to the contact surfaces 4 of the housing 2 and the ground electrode 3, the materials of the housing 2 and the ground electrode 3, which are molten at and inside the contact surfaces 4, flow to mix with each other. Consequently, the housing 2 and the ground electrode 3 are welded and thus joined together.

Figure 4:
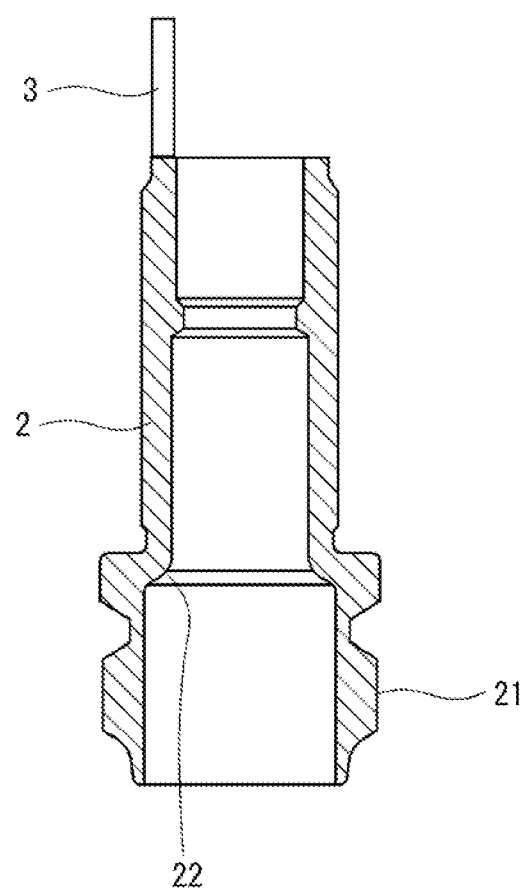
FIG. 4 is a cross-sectional view of a product welded by the welding apparatus according to the first embodiment.

FIG. 4 shows the product obtained by joining the housing 2 and the ground electrode 3 by the above-described resistance welding.

Figure 5:
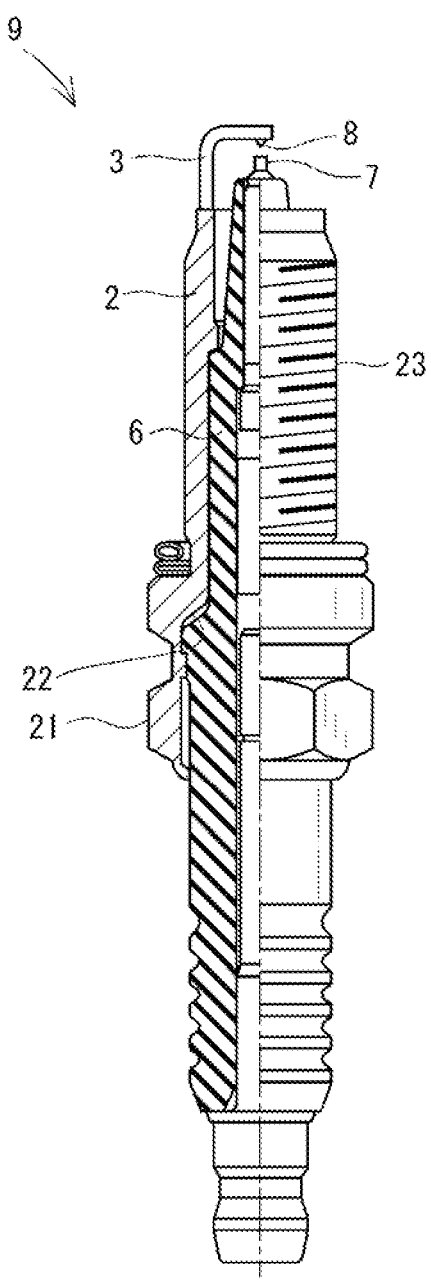
FIG. 5 is a cross-sectional view of a spark plug in which the product of FIG. 4 is incorporated.

In this product, as shown in FIG. 5, a thread 23 is formed by forging on a radially outer wall of the housing 2, and an insulator 6 and a center electrode 7 are mounted radially inside the housing 2. Then, a noble metal chip 8 is welded to an anti-housing-side end portion of the ground electrode 3. Thereafter, the ground electrode 3 is bent so as to have the chip 8 face the center electrode 7. As a result, the spark plug 9 is obtained.

Next, explanation will be made of the characteristics of the housing 2 and the ground electrode 3 which are welded by the welding apparatus 1 according to the present embodiment.

Figures 6, 7:
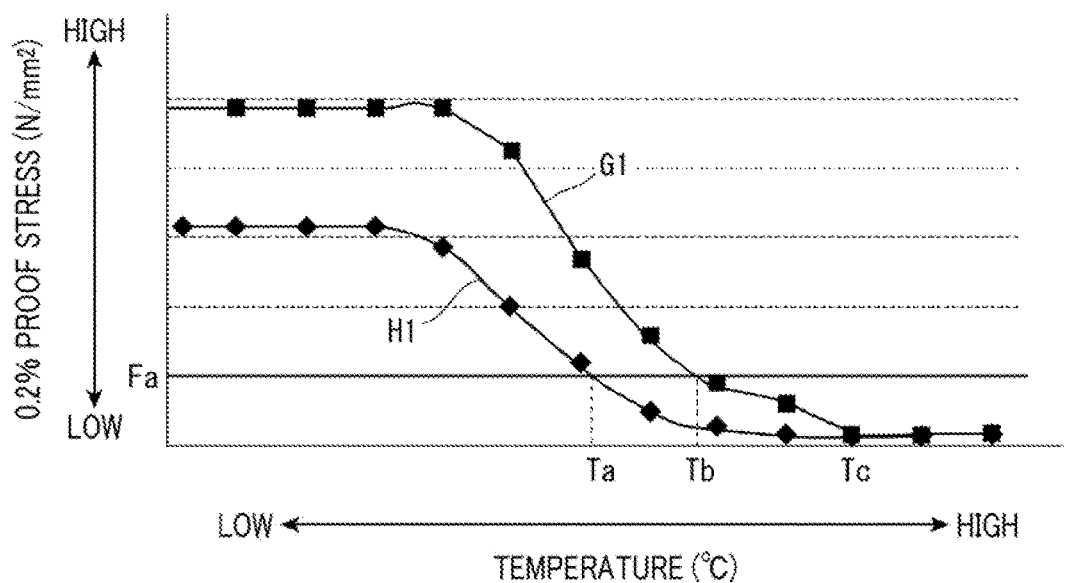
FIG. 6 is a tabular representation showing the electrical resistances and volumes of workpieces welded by the welding apparatus according to the first embodiment.
FIG. 7 is a graphical representation showing the relationship between the temperature and 0.2% proof stress of each workpiece.

As shown in FIG. 6, the ground electrode 3 is formed, for example, of a nickel alloy. The housing 2 is formed, for example, of carbon steel such as S17C. In this case, the electrical resistance of the ground electrode 3 is about 12 times higher than the electrical resistance of the housing 2. Moreover, the volume of the ground electrode 3 is smaller than the volume of the housing 2; thus, the heat capacity of the ground electrode 3 is about 1/45 the heat capacity of the housing 2. Consequently, when electric current is supplied to the ground electrode 3 and the housing 2, the ground electrode 3 is generally brought to high temperature earlier than the housing 2.

FIG. 7 shows the relationship between the temperature and 0.2% proof stress (yield stress) of the ground electrode 3 with a continuous line G1 and the relationship between the temperature and 0.2% proof stress of the housing 2 with a continuous line H1.

In the case where the ground electrode 3 is formed of a nickel alloy and the housing 2 is formed of carbon steel, as shown in FIG. 7, the 0.2% proof stress of the ground electrode 3 is higher than the 0.2% proof stress of the housing 2 at the same temperature below a given temperature Tc. Consequently, when the load (or pressure) applied to the contact surfaces 4 of the ground electrode 3 and the housing 2 is, for example, Fa, the deformable temperature Ta of the housing 2 (i.e., the temperature Ta at which the housing 2 becomes deformable) is lower than the deformable temperature Tb of the ground electrode 3 (i.e., the temperature Tb at which the ground electrode 3 becomes deformable).

FIGS. 8-10 show the relationship between the electric current supply time, electric current and temperature of each of the housing 2 and the ground electrode 3 when the contact surfaces 4 of the housing 2 and the ground electrode 3 are resistance-welded using different electric current supply patterns.

FIG. 8(A) shows a conventional electric currently supply pattern in which electric current, which is supplied from the welding power source 14 via the transformer 15 to the ground electrode 3 and the housing 2, is set to a given value Ia and supplied for the time period from an initial time instant t0 to a time instant t8.

FIG. 8(B) shows the change in temperature of the ground electrode 3 with a continuous line G2 and the change in temperature of the housing 2 with a continuous line H2 when the conventional electric current supply pattern shown in FIG. 8(A) is used.

As indicated with the continuous line 112 in FIG. 8(B), the housing 2 reaches its deformable temperature Ta at a time instant t6. On the other hand, as indicated with the continuous line G2 in FIG. 8(B), the ground electrode 3 reaches its deformable temperature Tb at a time instant t7 that is slightly later than the time instant t6. That is, when the conventional electric current supply pattern is used the temperatures of the housing 2 and the ground electrode 3 are almost simultaneously raised by the resistance heat generated at the contact surfaces 4 by the electric current supply.

FIG. 9(A) shows an electric current supply pattern according to a comparative example. In this electric current supply pattern, the electric current is set to a value Ic, which is considerably higher than the value Ia in the conventional electric current supply pattern, and supplied for the time period from the initial time instant t0 to a time instant t5 that is considerably earlier than the time instant t8 in the conventional electric current supply pattern. In addition, for the sake of comparison, in FIG. 9(A), the above-described conventional electric current supply pattern is also shown with dashed lines.

FIG. 9(B) shows the change in temperature of the ground electrode 3 with a continuous line G3 and the change in temperature of the housing 2 with a continuous line H3 when the electric current supply pattern shown in FIG. 9(A) is used. In addition, for the sake of comparison, in FIG. 9(B), the change in temperature of the ground electrode 3 and the change in temperature of the housing 2 when the above-described conventional electric current supply pattern is used are also shown respectively with dashed lines G2 and H2.

As indicated with the continuous line H3 in FIG. 9(B), the housing 2 reaches its deformable temperature Ta at a time instant t4. On the other band, as indicated with the continuous line G3 in FIG. 9(B), the ground electrode 3 reaches its deformable temperature Tb at a time instant t2 that is considerably earlier than the time instant t4. That is, when the electric current supply pattern according to the comparative example is used, the time instant at which the housing 2 reaches its deformable temperature Ta is advanced from the time instant t6 to the time instant t4 and the time instant at which the ground electrode 3 reaches its deformable temperature Tb is advanced from the time instant t7 to the time instant t2.

However, when the electric current supply pattern according to the comparative example is used, during the time period from the time instant t2 to the time instant t4, only the ground electrode 3 is molten, i.e., the housing 2 is not molten. Consequently, the welding strength is lowered. Moreover, after the time instant t2, the temperature of the ground electrode 3 becomes higher than the deformable temperature Tb. Consequently, the ground electrode 3 may be buckled. Furthermore, the welding deformation of the ground electrode 3 may be advanced, thereby resulting in a large amount of burrs.

In view of the above, in the present embodiment, an electric current supply pattern as shown in FIG. 10(A) is used. In this electric current supply pattern, for the time period from the initial time instant t0 to a time instant t1, the electric current is set to rise at the same rate as in the electric current supply pattern shown in FIG. 9(A). Further, for the time period from the time instant t1 to a time instant t3, the electric current is set to be constant at a value Ib that is higher than the value Ia in the conventional electric current supply pattern and lower than the value Ic in the electric current supply pattern according to the comparative example. Furthermore, for the time period from the time instant t3 to the time instant t5, the electric current is set to be constant at the value Ic. In addition, for the sake of comparison, in FIG. 10(A), the conventional electric current supply pattern is also shown with dashed lines; the electric current supply pattern according to the comparative example is also shown with chain lines.

FIG. 10(B) shows the change in temperature of the ground electrode 3 with a continuous line G4 and the change in temperature of the housing 2 with a continuous line H4 when the electric current supply pattern shown in FIG. 10(A) is used. In addition, for the sake of comparison, in FIG. 10(B), the change in temperature of the ground electrode 3 and the change in temperature of the housing 2 when the conventional electric supply pattern is used are also shown respectively with dashed lines G2 and H2; the change in temperature of the ground electrode 3 and the change in temperature of the housing 2 when the electric current supply pattern according to the comparative example is used are also shown respectively with chain lines G3 and H3.

As indicated with the continuous line G4 in FIG. 10(B), the ground electrode 3 reaches a temperature that is slightly lower than the deformable temperature Tb at the time instant t1 that is slightly earlier than the time instant t2. In the present embodiment, the controller 18 is capable of calculating the temperature of the ground electrode 3 based on the change rate of the temperature of the housing 2 sensed by the temperature sensor 16. The controller 18 controls the value Ib of the electric current so as to keep the temperature of the ground electrode 3 constant at the temperature slightly lower than the deformable temperature Tb for the time period from the time instant t1 to the time instant t3. Consequently, for the time period from the start of the electric current supply (i.e., from the initial time constant td) to the time instant t3, the Joule heat generated in the ground electrode 3 is transmitted to the housing 2 via the contact surfaces 4. As a result, as indicated with the continuous line 1-14 in FIG. 10(B), the housing 2 reaches its deformable temperature Ta at the time instant t3 that is earlier than the time instant t4.

Further, at the time instant t3, the controller 18 raises the electric current from the value Ib to the value Ic. Consequently, both the temperatures of the housing 2 and the ground electrode 3 become higher than their respective deformable temperatures Ta and Tb. Accordingly, it becomes possible to accomplish the resistance welding in a short time by increasing, from the time instant t3, the pressure applied by the second power supply jig 12 to the contact surfaces 4. Moreover, since both the materials of the housing 2 and the ground electrode 3 are molten and flow to mix with each other, the welding strength is enhanced.

Furthermore, since the temperature of the ground electrode 3 is kept lower than the deformable temperature Tb for the time period from the start of the electric current supply to the time instant t3, it becomes possible to suppress buckling of the ground electrode 3.

Moreover, it also becomes possible to reduce the amount of burrs formed during the resistance welding by reducing the welding deformation of the housing 2 and the ground electrode 3.

Figure 11:
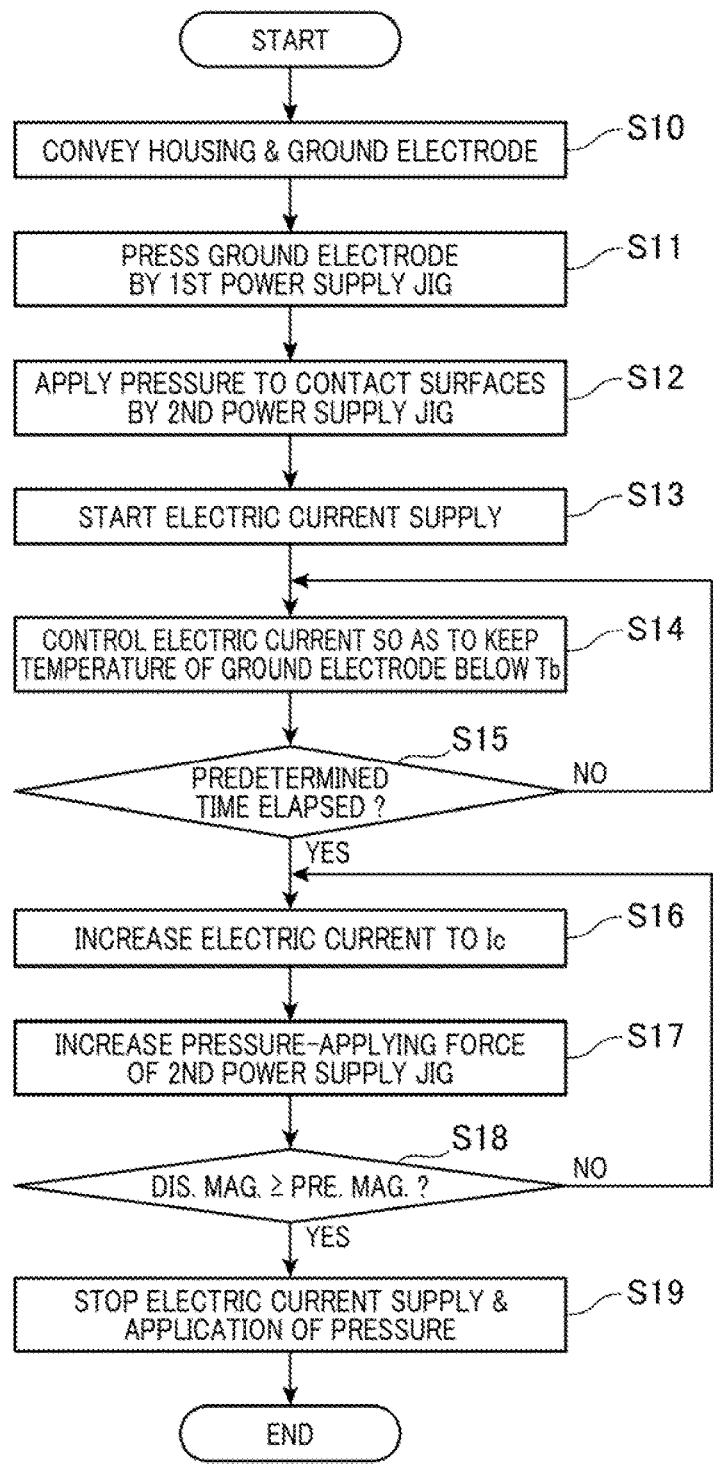
FIG. 11 is a flow chart illustrating a welding method according to the first embodiment.
Figure 12:
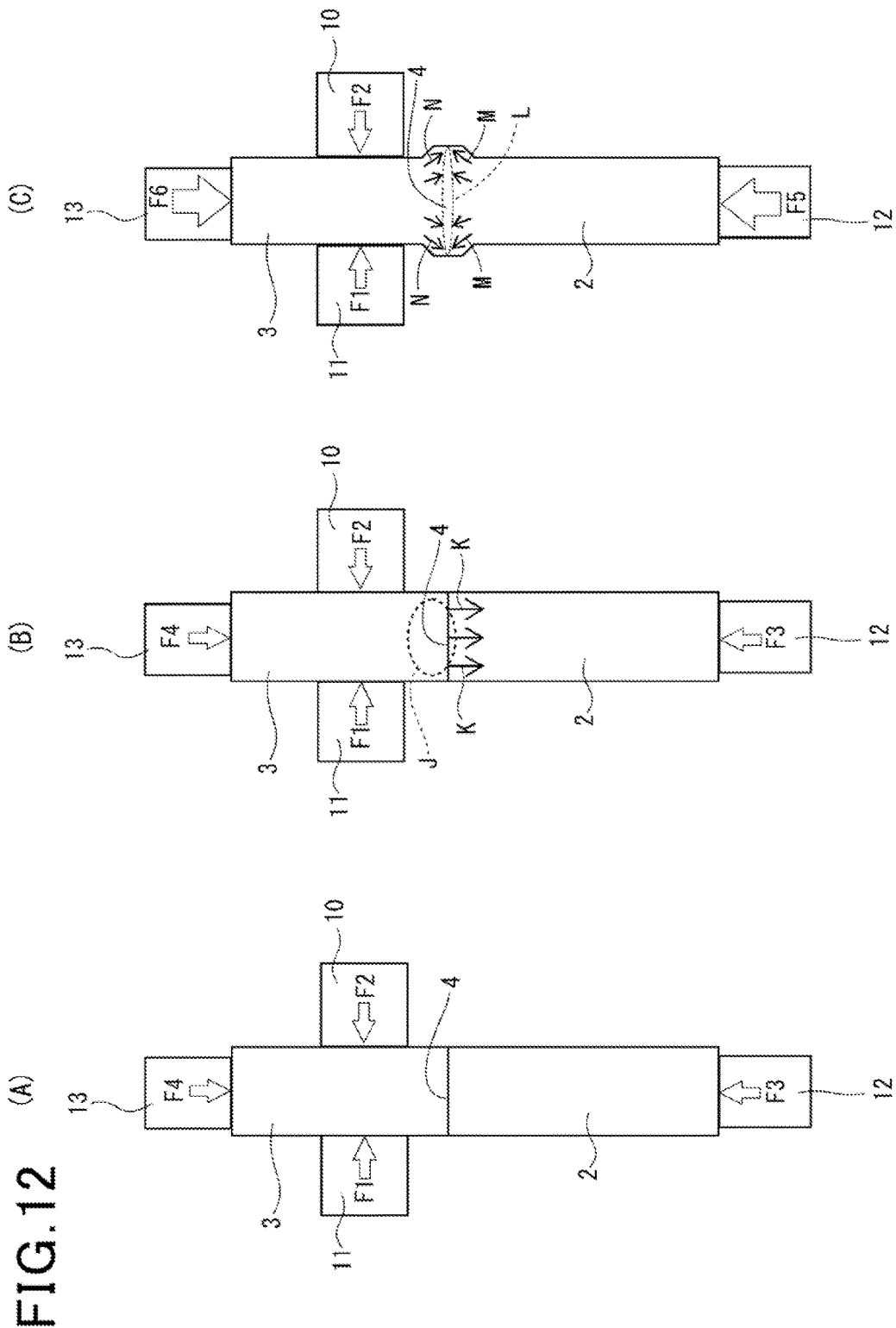
FIG. 12 is a schematic diagram showing how the resistance welding is performed on the workpieces.

Next, a welding method according to the present embodiment will be described with reference to FIGS. 11 and 12.

Upon start of the resistance welding process, first, at step S10, the housing 2 is conveyed by the conveying device 5 to the welding apparatus 1. Then, the second power supply jig 12 is moved through the hole 52 of the conveying apparatus 5 to lift the housing 2 toward the pressure application jig 13. At this time, the ground electrode 3 is arranged on the axial end surface of the housing 2 on the opposite side to the second power supply jig 12.

At step S11, the first power supply jig 11 presses the ground electrode 3 against the first positioning jig 10. Consequently, both the contacting portion 111 of the first power supply jig 11 and the contacting portion 101 of the first positioning jig 10 are brought into intimate contact with the ground electrode 3.

At step S12, the second power supply jig 12 presses the housing 2 and the ground electrode 3 against the pressure application jig 13, thereby applying pressure to the contact surfaces 4 of the housing 2 and the ground electrode 3. Consequently, the housing 2 and the ground electrode 3 are brought into intimate contact with each other.

It should be appreciated that steps S11 and S12 may also be performed concurrently or in a converse order. In addition, step S11 corresponds to an example of "pressing step", and step S12 corresponds to an example of "pressure applying step".

FIG. 12(A) illustrates how steps S11 and S12 are performed. As seen from the figure, the ground electrode 3 is pressed between the first power supply jig 11 and the first positioning jig 10. Moreover, the housing 2 and the ground electrode 3 are together pressed between the second power supply jig 12 and the pressure application jig 13, thereby applying pressure to the contact surfaces 4 of the housing 2 and the ground electrode 3.

In addition, in FIG. 12(A), the pressing forces of the first power supply jig 11 and the first positioning jig 10 are schematically designated respectively with arrows F1 and F2; the pressure-applying forces of the second power supply jig 12 and the pressure application jig 13 are schematically designated respectively with arrows F3 and F4.

Referring back to FIG. 11, at step S13, electric current supply is started. More specifically, electric current is supplied from the welding power source 14 via the transformer 15 to the first power supply jig 11, the ground electrode 3, the contact surfaces 4, the housing 2 and the second power supply jig 12.

Further, at step S14, the controller 18 feedback-controls the value Ib of the electric current so as to keep the temperature of the ground electrode 3 constant at the temperature Tb' that is slightly lower than the deformable temperature Tb of the ground electrode 3.

More specifically, at this step, when the temperature of the ground electrode 3 calculated based on the temperature sensed by the temperature sensor 16 becomes higher than Tb' by a predetermined temperature, the controller 18 lowers the value Ib of the electric current. In contrast, when the temperature of the ground electrode 3 calculated based on the temperature sensed by the temperature sensor 16 becomes lower than Tb' by a predetermined temperature, the controller 18 raises the value Ib of the electric current.

At step S15, the controller 18 determines whether a predetermined time has elapsed from the start of the electric current supply. Here, the predetermined time corresponds to the length of time from the initial time instant t0 to the time instant t3.

When the predetermined time has not elapsed (step S15: NO), the process returns to step S14. Then, the electric current supply is continued with the value Ib of the electric current controlled by the controller 18. Consequently, buckling and melting of the ground electrode 3 are suppressed until the predetermined time has elapsed from the start of the electric current supply.

In addition, the predetermined time at step S15 has been experimentally determined as the length of time from the start of the electric current supply until the housing 2 reaches its deformable temperature Ta; the predetermined time has been previously stored in the controller 18.

It should be noted that at step S15, the controller 18 may determine, based on the temperature sensed by the temperature sensor 16, whether the housing 2 has reached its deformable temperature Ta instead of or in addition to determining whether the predetermined time has elapsed from the start of the electric current supply.

FIG. 12(B) illustrates how steps S13-S15 are performed. As seen from the figure, when electric current flows from the first power supply jig 11 via the ground electrode 3 and the housing 2 to the second power supply jig 12, the temperature of the ground electrode 3 is raised by the Joule heat earlier than the temperature of the housing 2. Then, the heat of the ground electrode 3 is transmitted to the housing 2 via the contact surfaces 4.

In addition, in FIG. 12(B), the Joule heat generated in the ground electrode 3 is schematically designated with a dashed line J; the transmission of the Joule heat to the housing 2 is schematically designated with arrows K.

Referring back to FIG. 11, when it is determined at step S15 that the predetermined time has elapsed (step S15: YES), the process then proceeds to step S16.

At step S16, the controller 18 raises the electric current supplied to the ground electrode 3 and the housing 2 from the value Ib to the value Ic. Consequently, the temperature of the ground electrode 3 becomes higher than or equal to Tb at which the ground electrode 3 can be deformed and molten; the temperature of the housing 2 becomes higher than or equal to Ta at which the housing 2 can be deformed and molten.

At step S17, which is performed concurrently with step S16, the pressure-applying force of the second power supply jig 12 is increased. Consequently, the ground electrode 3 and the housing 2 are resistance-welded.

At step S18, the controller 18 determines, based on the signal outputted from the displacement sensor 17, whether the displacement magnitude caused by the welding deformation of the housing 2 and the ground electrode 3 has reached a predetermined magnitude.

When the displacement magnitude is less than the predetermined magnitude (step S18: NO), the process returns to step S16. Consequently, the resistance welding is continued.

FIG. 12(C) illustrates how steps S16-S18 are performed. As seen from the figure, when the electric current supplied to the ground electrode 3 and the housing 2 is raised from the value Ib to the value Jo and the pressure-applying force of the second power supply jig 12 is increased, the materials of the housing 2 and the ground electrode 3 at and inside the contact surfaces 4 are molten by the resistance heat generated at the contact surfaces 4. Further, the materials of the housing 2 and the ground electrode 3, which are molten at and inside the contact surfaces 4, flow to mix with each other; thus, the resistance welding is performed.

In FIG. 12(C), the resistance heat generated at the contact surfaces 4 is schematically designated with a dashed line L; the flow of the materials of the housing 2 and the ground electrode 3, which are molten inside the contact surfaces 4, is schematically designated with arrows M and N. Moreover, the pressure-applying forces of the second power supply jig 12 and the pressure application jig 13 are schematically designated respectively with arrows F5 and F6. In addition, the pressure-applying forces F5 and F6 of the second power supply jig 12 and the pressure application jig 13 shown in FIG. 12(C) are greater than the pressure-applying forces F3 and F4 of the same shown in FIG. 12(B).

Referring back to FIG. 11, when it is determined at step S18 that the displacement magnitude caused by the welding deformation of the housing 2 and the ground electrode 3 becomes greater than or equal to the predetermined magnitude (step S18: YES), the process proceeds to step S19.

At step S19, the controller 18 stops both the electric current supply from the welding power source 14 and the application of pressure by the second power supply jig 12. Consequently, the resistance welding is completed.

In addition, steps 13-19 together correspond to an example of "electric current supplying step".

According to the present embodiment, it is possible to achieve the following advantageous effects.

(1) In the present embodiment, electric current is supplied to the first power supply jig 11, the ground electrode 3, the housing 2 and the second power supply jig 12 in a state where the ground electrode 3 is pressed between the first positioning jig 10 and the first power supply jig 11 and the pressure application jig 13 and the second power supply jig 12 together apply pressure to the contact surfaces 4 of the ground electrode 3 and the housing 2.

With the pressure application jig 13 and the second power supply jig 12 opposed to each other and together applying pressure to the contact surfaces 4, it is possible to reliably impose a load required for the resistance welding on the contact surfaces 4. Consequently, it is possible to perform the process (or step) of applying pressure to the contact surfaces 4 by the pressure application jig 13 and the second power supply jig 12 and the process (or step) of pressing the ground electrode 3 by the first positioning jig 10 and the first power supply jig 11 either concurrently or consecutively. As a result, it is possible for the welding apparatus 1 to resistance-weld the housing 2 and the ground electrode 3 in a short time.

(2) In the present embodiment, the first power supply jig 11 has the contacting portion 111 capable of making surface contact or line contact with the ground electrode 3.

Consequently, the contact area between the first power supply jig 11 and the ground electrode 3 becomes large, thereby lowering the constriction resistance to electric current flowing through the contact area. As a result, the Joule heat generated in the ground electrode 3 becomes small, thus making it possible to prevent buckling of the ground electrode 3.

In addition, the first power, supply jig 11 can be used with the position of the contacting portion 111 being offset according to the aged deterioration thereof, thereby extending the service life of the first power supply jig 11.

(3) In the present embodiment, the first power supply jig 11 presses the ground electrode 3 at a position slightly away from the contact surfaces 4 of the ground electrode 3 and the housing 2.

Consequently, it is possible to suppress buckling of the ground electrode 3 on the housing 2 side of the contact region between the first power supply jig 11 and the ground electrode 3.

(4) In the present embodiment, the controller 18 keeps the temperature of the ground electrode 3 at the temperature Tb' at which it is possible to suppress melting of the ground electrode 3 until the predetermined time has elapsed from the start of the electric current supply and then increases the temperatures of the housing 2 and the ground electrode 3 to temperatures at which it is possible to melt the housing 2 and the ground electrode 3.

Consequently, it becomes possible to transmit to the housing 2 the Joule heat generated in the ground electrode 3 during the predetermined time from the start of the electric current supply and thereby heat the housing 2 and then heat both the housing 2 and the ground electrode 3 to the temperatures at which it is possible to melt them and thereby resistance-weld the housing 2 and the ground electrode 3. That is, it becomes possible to heat in a short time the housing 2 that has the low electrical resistance and the large heat capacity as shown in FIG. 6. Moreover, since both the housing 2 and the ground electrode 3 are molten at the contact surfaces 4, the welding strength is enhanced.

(5) In the present embodiment, the controller 18 controls the electric current based on the temperature sensed by the temperature sensor 16.

Consequently, even when there exists a manufacturing tolerance for, for example, the cross-sectional area of the ground electrode 3, it is still possible for the welding apparatus 1 to heat the ground electrode 3 and the housing 2 to given temperatures in a predetermined time, thereby maintaining the desired welding strength and quality.

(6) In the present embodiment, the controller 18 keeps the temperature of the ground electrode 3 at the temperature Tb' at which it is possible to suppress melting of the ground electrode 3 until the temperature of the housing 2 at the contact surface 4 thereof has been increased to the temperature Ta at which the housing 2 can be molten.

Consequently, it becomes possible to heat the housing 2 in a short time. As a result, it becomes possible to perform the resistance welding in a short time.

(7) In the present embodiment, the controller 18 controls the electric current based also on the displacement magnitude sensed by the displacement sensor 17.

Consequently, it becomes possible to stop both the application of pressure by the second power supply jig 12 to the contact surfaces 4 and the electric current supply when the displacement magnitude sensed by the displacement sensor 17 has reached the predetermined magnitude (or target magnitude). Therefore, even when there exists a manufacturing tolerance for, for example, the cross-sectional area of the ground electrode 3, it is still possible for the welding apparatus 1 to perform the resistance welding so as to Obtain the desired length of the ground electrode 3 after the resistance welding.

Moreover, since the amount of welding deformation of the ground electrode 3 and the housing 2 can be kept constant, it is possible to suppress the formation of burrs during the resistance welding.

(8) In the present embodiment, the welding power source 14 supplies the DC electric current through the inverter control.

Therefore, the electric current does not change across 0 unlike AC electric current. Consequently, it becomes possible to continuously increase the temperature of the contact surfaces 4, thereby making it possible to perform the resistance welding in a short time.

(9) The welding method according to the present embodiment includes: pressing the ground electrode 3 by the first power supply jig 11 (step S11); applying pressure to the contact surfaces 4 of the ground electrode 3 and the housing 2 by the second power supply jig 12 (step S12); and supplying electric current to the first power supply jig 11, the ground electrode 3, the housing 2 and the second power supply jig 12 (steps S13-S19).

Consequently, it is possible to perform the pressing process and the pressure applying process either concurrently or consecutively. As a result, it is possible to resistance-weld the housing 2 and the ground electrode 3 in a short time.

(10) In the welding method according to the present embodiment, the electric current is supplied so as to keep the temperature of the ground electrode 3 at the temperature Tb' at which it is possible to suppress melting of the ground electrode 3 until the predetermined time has elapsed from the start of the electric current supply and then increases the temperatures of the housing 2 and the ground electrode 3 to temperatures at which it is possible to melt the housing 2 and the ground electrode 3.

Consequently, it becomes possible to transmit to the housing 2 the Joule heat generated in the ground electrode 3 during the predetermined time from the start of the electric current supply and thereby heat the housing 2 and then heat both the housing 2 and the ground electrode 3 to the temperatures at which it is possible to melt them and thereby resistance-weld the housing 2 and the ground electrode 3. That is, it becomes possible to heat in a short time the housing 2 that has the low electrical resistance and the large heat capacity. Moreover, since both the housing 2 and the ground electrode 3 are molten at the contact surfaces 4, the welding strength is enhanced.

Second Embodiment

Figure 13:
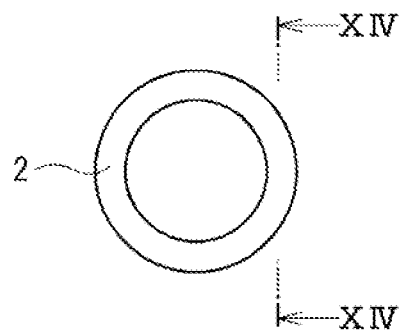
FIG. 13 is a plan view of a housing according to a second embodiment.
Figure 14:
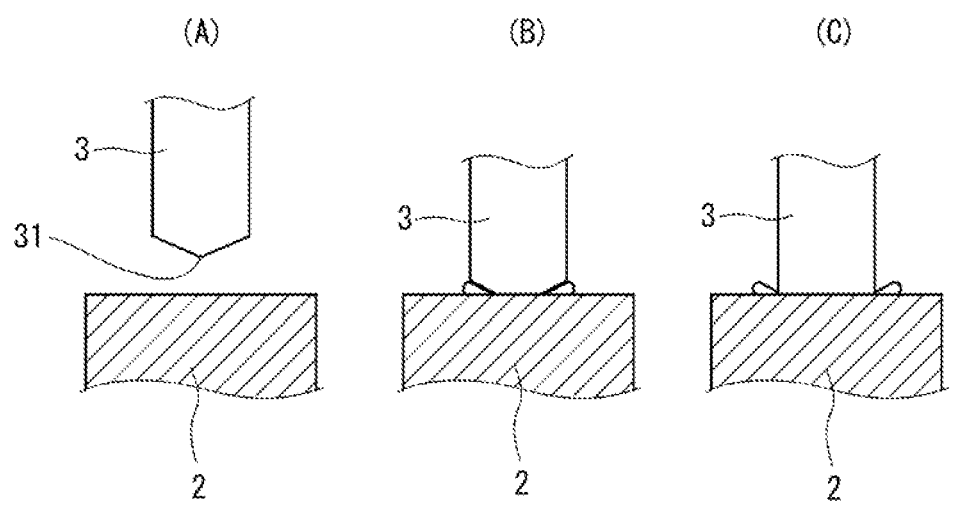
FIG. 14 is a schematic diagram showing, on a cross section taken along the line XIV-XIV in FIG. 13, how the resistance welding is performed on the workpieces.

A welding method according to a second embodiment will be described with reference to FIGS. 13 and 14.

In the present embodiment, the welding method further includes, before the pressing step S11 and the pressure applying step S12 described in the first embodiment, a step of forming a protrusion 31 at the housing-side end of the ground electrode 3 as shown in FIG. 14(A).

In addition, the protrusion 31 may be formed so that when viewed from the housing 2 side, the edge line of the protrusion 31 extends either in the direction of major axis (or longer sides) or in the direction of minor axis (or shorter sides) of the ground electrode 3.

In resistance-welding the housing 2 and the ground electrode 3, both the electric current and the load of the second power supply jig 12 and the pressure application jig 13 are concentrated on the protrusion 31. Consequently, as shown in FIG. 14(B), the non-oxidized material of the ground electrode 3 located inside an oxide layer formed on the surface of the ground electrode 3 is molten by an amount necessary for the welding. As a result, as shown in FIG. 14(C), it becomes possible to reduce the amount of welding deformation of the ground electrode 3 and the amount of burrs sticking out from the contact surfaces 4.

Accordingly, with the welding method according to the present embodiment, it is possible to improve the welding strength and the welding quality.

Third Embodiment

Figure 15:
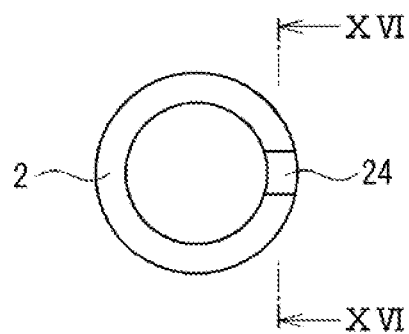
FIG. 15 is a plan view of a housing according to a third embodiment.
Figure 16:
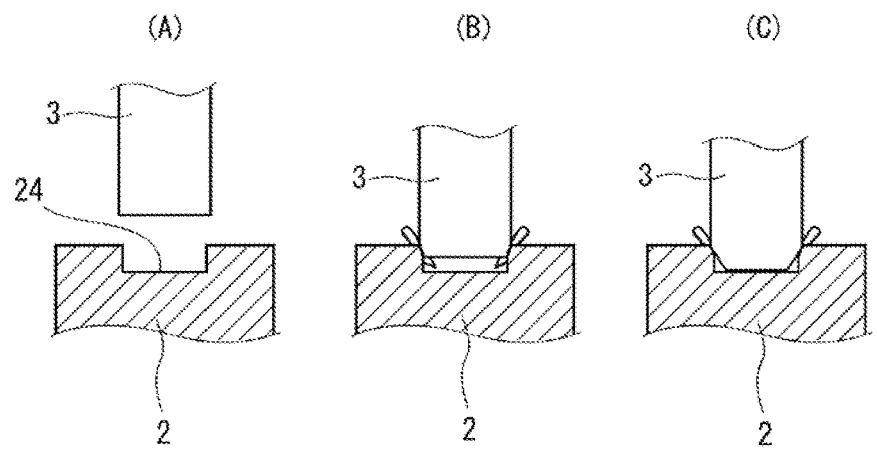
FIG. 16 is a schematic diagram showing, on a cross section taken along the line XVI-XVI in FIG. 15, how the resistance welding is performed on the workpieces.

A welding method according to a third embodiment will be described with reference to FIGS. 15 and 16.

In the present embodiment, the welding method further includes, before the pressing step S11 and the pressure applying step S12 described in the first embodiment, a step of forming a recess 24, which is smaller than a cross section of the ground electrode 3, in the ground electrode-side end surface of the housing 2 as shown in FIG. 16(A).

In resistance-welding the housing 2 and the ground electrode 3, both the electric current and the load of the second power supply jig 12 and the pressure application jig 13 are concentrated on the contact region between the inner wall of the recess 24 of the housing 2 and the ground electrode 3. Consequently, as shown in FIG. 16(B), the non-oxidized materials of the housing 2 and the ground electrode 3 located inside oxide layers formed on the surfaces of the housing 2 and the ground electrode 3 are molten by an amount necessary for the welding. As a result, as shown in FIG. 16(C), it becomes possible to reduce the amount of welding deformation of the ground electrode 3 and the amount of burrs sticking out from the contact surfaces 4.

Accordingly, with the welding method according to the present embodiment, it is possible to improve the welding strength and the welding quality.

Fourth Embodiment

Figure 17:
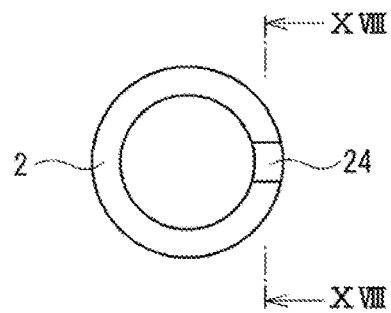
FIG. 17 is a plan view of a housing according to a fourth embodiment.
Figure 18:
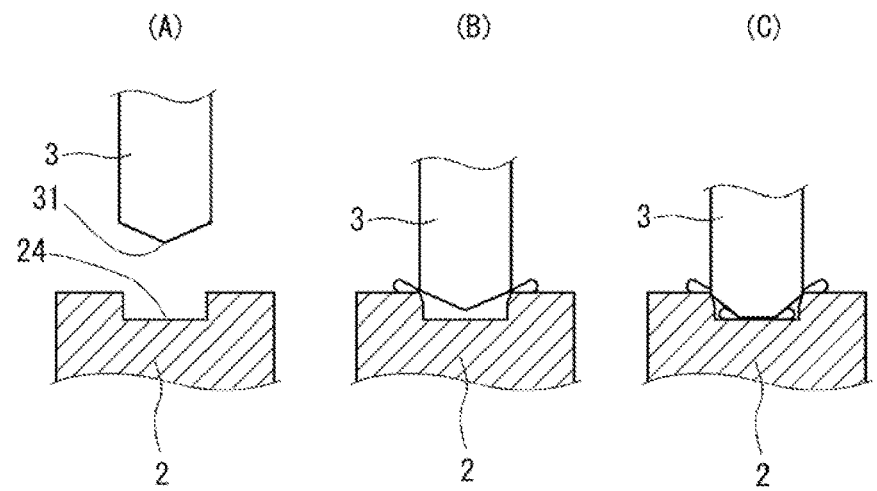
FIG. 18 is a schematic diagram showing, on a cross section taken along the line XVIII-XVIII in FIG. 17, how the resistance welding is performed on the workpieces.

FIGS. 17 and 18 illustrate a welding method according to a fourth embodiment, which is a combination of the welding methods according to the second and third embodiments.

Accordingly, with the welding method according to the present embodiment, it is possible to achieve the same advantageous effects as with the welding methods according to the second and third embodiments.

Fifth Embodiment

Figure 19:
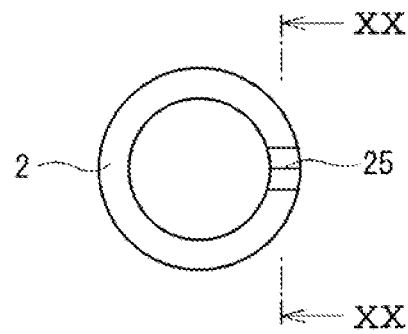
FIG. 19 is a plan view of a housing according to a fifth embodiment.
Figure 20:
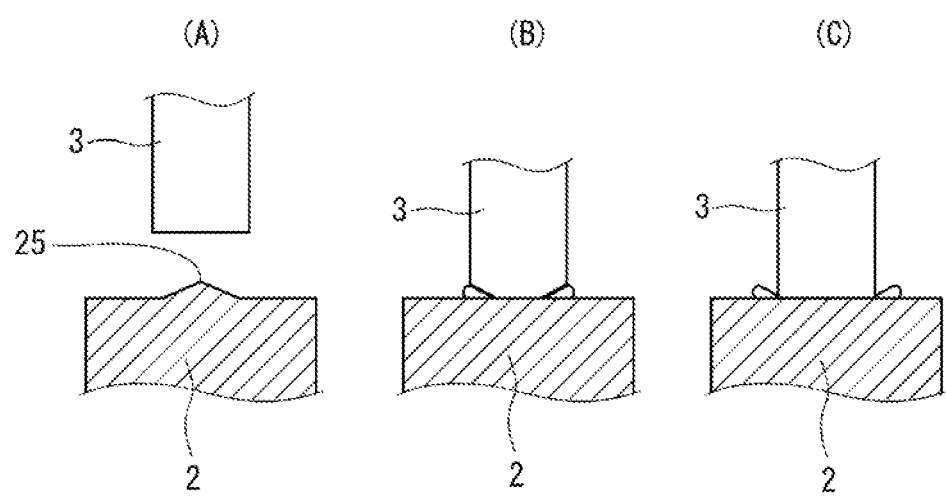
FIG. 20 is a schematic diagram showing, on a cross section taken along the line XX-XX in FIG. 19, how the resistance welding is performed on the workpieces.

A welding method according to a fifth embodiment will be described with reference to FIGS. 19 and 20.

In the present embodiment, the welding method further includes, before the pressing step S11 and the pressure applying step S12 described in the first embodiment, a step of forming a protrusion 25 on the ground electrode-side end surface of the housing 2 as shown in FIG. 20(A).

In resistance-welding the housing 2 and the ground electrode 3, both the electric current and the load of the second power supply jig 12 and the pressure application jig 13 are concentrated on the contact region between the protrusion 25 of the housing 2 and the ground electrode 3. Consequently, as shown in FIG. 20(B), the non-oxidized material of the housing 2 located inside an oxide layer formed on the surface of the housing 2 is molten by an amount necessary for the welding. As a result, as shown in FIG. 20(C), it becomes possible to reduce the amount of welding deformation of the ground electrode 3 and the amount of burrs sticking out from the contact surfaces 4.

Accordingly, with the welding method according to the present embodiment, it is possible to improve the welding strength and the welding quality.

Sixth Embodiment

Figure 21:
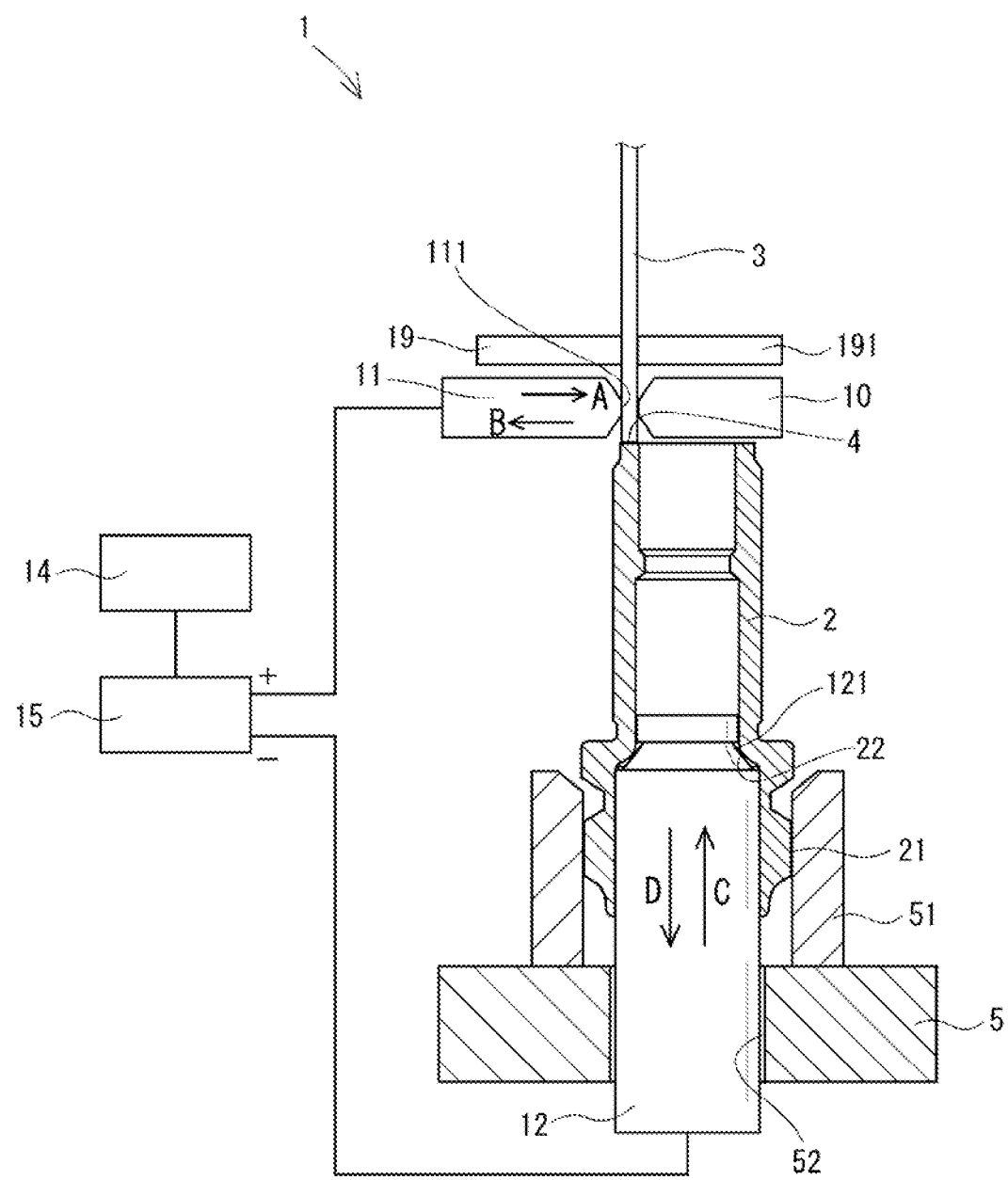
FIG. 21 is a configuration diagram of a welding apparatus according to a sixth embodiment.

A welding apparatus 1 according to a sixth embodiment will be described with reference to FIG. 21.

In the present embodiment, a material for forming the ground electrode 3 is wound on, for example, a roller (not shown) and fed to the axial end surface of the housing 2 from the roller.

Therefore, the welding apparatus 1 according to the present embodiment does not include the pressure application jig 13 included in the welding apparatus 1 according to the first embodiment.

Instead, the areas of the ground electrode-side end surfaces of the first power supply jig 11 and the first positioning jig 10 in the welding apparatus 1 according to the present embodiment are set to be smaller than those in the welding apparatus 1 according to the first embodiment. Moreover, the force of the first power supply jig 11 pressing the ground electrode 3 against the first positioning jig 10 in the welding apparatus 1 according to the present embodiment is set to be greater than that in the welding apparatus 1 according to the first embodiment.

Consequently, in the welding apparatus 1 according to the present embodiment, when the second power supply jig 12 is moved in the direction of arrow C to apply pressure to the contact surfaces 4 of the housing 2 and the ground electrode 3, movement of the ground electrode 3 is restricted (or stopped) by both friction force between the first power supply jig 11 and the ground electrode 3 and friction force between the first positioning jig 10 and the ground electrode 3.

Moreover, in the welding apparatus 1 according to the present embodiment, after the force of the first power supply jig 11 pressing the ground electrode 3 against the first positioning jig 10 is stabilized, the application of pressure to the contact surfaces 4 of the housing 2 and the ground electrode 3 is performed by the second power supply jig 12. Then, electric current is supplied from the welding power source 14 via the transformer 15 to the first power supply jig 11, the ground electrode 3, the contact surfaces 4, the housing 2 and the second power supply jig 12, thereby resistance-welding the housing 2 and the ground electrode 3. Thereafter, the material of the ground electrode 3 fed from the roller is cut into a length of the ground electrode 3 suitable for use in the spark plug 9.

Furthermore, the welding method described in the first embodiment can also be applied to the welding apparatus 1 according to the present embodiment. That is, the temperature of the ground electrode 3 is first kept at the temperature Tb' at which it is possible to suppress melting of the ground electrode 3 until the predetermined time has elapsed from the start of the electric current supply; then, the temperatures of the housing 2 and the ground electrode 3 are increased to temperatures at which it is possible to melt the housing 2 and the ground electrode 3 with the pressure-applying force of the second power supply jig 12 being simultaneously increased. As a result, it is possible for the welding apparatus 1 to accomplish the resistance welding in a short time.

While the above particular embodiments have been shown and described, it will be understood by those skilled in the art that various modifications, changes and improvements may be made without departing from the spirit of the present invention.

(1) For example, in the above embodiments, the welding apparatus 1 and the welding method are used to resistance weld the housing 2 and the ground electrode 3 for the spark plug 9. However, in other embodiments, the workpieces that are resistance-welded by the welding apparatus 1 and the welding method are not limited the housing 2 and the ground electrode 3 for the spark plug 9. Instead, various tubular members and bar members can be resistance-welded by the welding apparatus 1 and the welding method.

(2) In the above embodiments, the welding power source 14 is configured to supply DC electric current. However, in other embodiments, the welding power source 14 may be configured to supply AC electric current.

(3) In the above embodiments, the temperature sensor 16 is configured to sense the temperature of a part of the housing 2 adjacent to the contact surfaces 4. However, in other embodiments, the temperature sensor 16 may be configured to sense the temperature of the contact surfaces 4 or the temperature of a part of the ground electrode 3 adjacent to the contact surfaces 4.

What is claimed is:

1. A welding apparatus for resistance-welding a tubular member and a bar member arranged in contact with one axial end surface of the tubular member, the welding apparatus comprising:
    a positioning jig configured to contact the bar member from a first side of the bar member in a direction perpendicular to an extending direction of the bar member;
    a first power supply jig configured to actively press the bar member from a second side of the bar member opposite the first side of the bar member, the first power supply jig actively pressing the bar member against the positioning jig in the direction perpendicular to the extending direction of the bar member;
    a second power supply jig located on an anti-bar member side of the tubular member, the second power supply jig being configured to actively press against respective contact surfaces of the bar member and the tubular member in the extending direction of the bar member, the bar member being actively pressed between the positioning jig and the first power supply jig, the second power supply jig actively applying pressure to the contact surfaces of the bar member and the tubular member;
    an electric current supplier supplying electric current to the first power supply jig, the bar member, the contact surfaces, the tubular member, and the second power supply jig, the bar member having a smaller heat capacity than the tubular member; and
    a controller configured to:
        receive a temperature of the tubular member measured by a temperature sensor;
        calculate a temperature of the bar member based on a rate of change of the measured temperature of the tubular member; and
        control the electric current supplied by the electric current supplier so as to: (i) maintain the temperature of the bar member, as calculated based on the measured temperature of the tubular member by the temperature sensor, at a constant value at a temperature that suppresses melting of the bar member for a predetermined period of time, which is after a start of the electric current supply and after the temperature of the bar member is increased to reach the temperature that suppresses melting of the bar member, and then (ii) increase the temperature of the bar member and the temperature of the tubular member to temperatures that melt the bar member and the tubular member.

2. The welding apparatus as set forth in claim 1, further comprising a pressure application jig that is provided on an anti-housing side of the bar member to apply, together with the second power supply jig, pressure to the contact surfaces of the bar member and the tubular member.

3. The welding apparatus as set forth in claim 1, wherein the first power supply jig has a contacting portion that surface contacts or line contacts the bar member.

4. The welding apparatus as set forth in claim 1, wherein the first power supply jig is configured to press the bar member at a position slightly away from the contact surfaces of the bar member and the tubular member so as to suppress buckling of the bar member due to Joule heat on a housing side of a contact region between the first power supply jig and the bar member.

5. The welding apparatus as set forth in claim 1, further comprising a displacement sensor that detects a displacement magnitude caused by a welding deformation of the tubular member and the bar member, wherein
    the controller controls, based on the displacement magnitude detected by the displacement sensor, a pressure-applying force of the second power supply jig as well as the electric current supplied by the electric current supplier.

6. The welding apparatus as set forth in claim 1, wherein the electric current supplier supplies, as the electric current, DC electric current through an inverter control.

7. A method of resistance-welding a tubular member and a bar member arranged in contact with one axial end surface of the tubular member, the method comprising the steps of:
    actively pressing the bar member by a first power supply jig;
    actively pressing contact surfaces of the bar member and the tubular member by a second power supply jig;
    receiving a temperature of the tubular member measured by a temperature sensor;
    calculating a temperature of the bar member based on a rate of change of the measured temperature of the tubular member; and
    supplying electric current, after the pressing step and the pressure applying step, to the first power supply jig, the bar member, the contact surfaces, the tubular member, and the second power supply jig, the electric current is supplied so as to: (i) maintain the temperature of the bar member, as calculated based on the measured temperature of the tubular member by the temperature sensor, at a constant value at a temperature that suppresses melting of the bar member for a predetermined period of time, which is after a start of the electric current supply and after the temperature of the bar member is increased to reach the temperature that suppresses melting of the bar member, and then (ii) increase the temperatures of the bar member and the tubular member to temperatures that melt the bar member and the tubular member, the bar member having a smaller heat capacity than the tubular member.

8. The method as set forth in claim 7, further comprising, before the pressing step and the pressure applying step, a step of forming a protrusion at a tubular member-side end of the bar member.

9. The method as set forth in claim 7, further comprising, before the pressing step and the pressure applying step, a step of forming a recess, which is smaller than a cross section of the bar member, in the axial end surface of the tubular member facing the bar member.

10. The method as set forth in claim 7, further comprising, before the pressing step and the pressure applying step, a step of forming a protrusion on the axial end surface of the tubular member facing the bar member.

* * * * *